(12) United States Patent
Currle et al.

(10) Patent No.: US 7,497,897 B2
(45) Date of Patent: Mar. 3, 2009

(54) AIR SUPPLY DEVICE FOR THE PASSENGER CELL OF A MOTOR VEHICLE

(75) Inventors: Joachim Currle, Stuttgart (DE); Frank Fruehauf, Aichwald (DE)

(73) Assignee: Daimler AG, Stuttgart (DE)

(*) Notice: Subject to any disclaimer, the term of this patent is extended or adjusted under 35 U.S.C. 154(b) by 562 days.

(21) Appl. No.: 11/274,335

(22) Filed: Nov. 16, 2005

(65) Prior Publication Data

US 2006/0117724 A1   Jun. 8, 2006

(30) Foreign Application Priority Data

Nov. 16, 2004   (DE) .................. 10 2004 055 259

(51) Int. Cl.
*B01D 45/14* (2006.01)

(52) U.S. Cl. .................... 95/270; 55/385.3; 55/406; 55/437; 55/462; 96/397

(58) Field of Classification Search ............... 55/385.3, 55/400, 406, 437, 462; 96/397; 95/270
See application file for complete search history.

(56) References Cited

U.S. PATENT DOCUMENTS 3,240,002 A * 3/1966 Diotalevi ............... 55/400
3,865,022 A * 2/1975 Ahlrich .................. 126/299 D

* cited by examiner

*Primary Examiner*—Robert A Hopkins
(74) *Attorney, Agent, or Firm*—Crowell & Moring LLP

(57) ABSTRACT

An air supply device for the passenger cell of a motor vehicle includes a rotating element formed in an axial suction intake region of the air-conditioning blower and upstream of the air-conditioning blower. The rotating element covers the air inlet region such that all the sucked-in drops impinge onto the element. Arranged in front of the housing wall of the air supply device are drop interception elements which are fixed lamellae of low inclination or wedge structures with acute wedge angles. The drop interception elements are inclined so that the drops impinge at an acute angle. Active water and particle (pre)-separation is thereby ensured.

25 Claims, 2 Drawing Sheets

AIR SUPPLY DEVICE FOR THE PASSENGER CELL OF A MOTOR VEHICLE

BACKGROUND AND SUMMARY OF THE INVENTION

The present invention relates to an air supply device for the passenger cell of a motor vehicle, and more particularly, to an air supply device designed not only for air conveyance, but also for the separation of water from fresh air to be supplied to the passenger cell.

The conveyance of air and the separation of water from air supplied to a passenger cell have hitherto taken place in separate components, to be precise by way of a blower and a water box. In this arrangement, for example, large-volume water boxes in the engine space are needed for water separation. Known systems, as disclosed, for example, in DE 199 44 530 C1 and DE 197 56 983 C1, use air-deflecting elements which lead to high pressure losses.

Furthermore, passive water separation systems are known such as shown, for example, in DE 199 23 195 C1, in which water drops from supplied fresh air fall into an interspace between lamellae in the region of a water outflow and may burst apart when they impinge on the water outflow bottom. This gives rise to an undesirable mist of very small water drops which may pass back into the air flow and be entrained by the latter.

An object of the present invention is to provide an air supply device in which active water and particle (pre-)separation takes place.

This object has been achieved, according to the present invention, by way of an air supply device for the axial suction intake of fresh air and, opposite, a port for the issue of fresh air from which water has been separated, and a rotating element operatively arranged in an axial suction intake region of the housing, said rotating element effectively covering the port for the axial suction intake of fresh air in such a way that all the sucked-in drops of water impinge onto the rotating element and are transported towards the wall of the housing and discharged via a water discharge.

The air supply device according to the present invention ensures, a reliable separation of raindrops out of the fresh air stream sucked in for the purpose of vehicle air-conditioning. Moreover, air conveyance and water separation as well as particle (pre-)separation, can be simultaneously carried out in one multi-functional component. For this purpose, in the axial suction-intake region of the air-conditioning blower, raindrops sucked in together with the fresh air impinge on rotating elements axially preceding the blower. The raindrops thereby acquire an essentially tangential momentum, with the result that they are transported towards the housing wall. They are intercepted there by drop interception elements, without bursting open, and are discharged.

In this manner, only a very small construction space is required for the air supply device according to the present invention. Moreover, the air entry area is smaller, and consequently the entering water quantity or water quantity to be discharged is reduced.

DETAILED DESCRIPTION OF THE DRAWINGS

According to the basic principle of the present invention, a rotating element axially precedes (i.e. upstream of) an air-conditioning blower in an axial suction-intake region of an air-conditioning blower of a motor vehicle. The rotating element either may be connected to the air-conditioning blower or be integrated in the latter or may be constructed separate therefrom. Raindrops sucked in together with fresh air by the air-conditioning blower impinge on this rotating element. During this impingement onto the rotating element, the raindrops acquire an essentially tangential momentum, with the result that they are transported towards the housing wall. In order to prevent the drops from bursting open on the housing wall, drop interception elements, at which the drops are intercepted and discharged, are optionally located in front of the wall. The drop interception elements are inclined with respect to the impinging drops in such a way that the drops strike them at an acute angle.

With specific reference to FIG. 1, the above-described functional principle or concept is described in more detail below for a first exemplary embodiment of the air supply device according to the invention, more precisely, an air supply device integrated into an air-conditioning blower module, constituting a multi-functional component for air conveyance and water separation.

Figure 1:
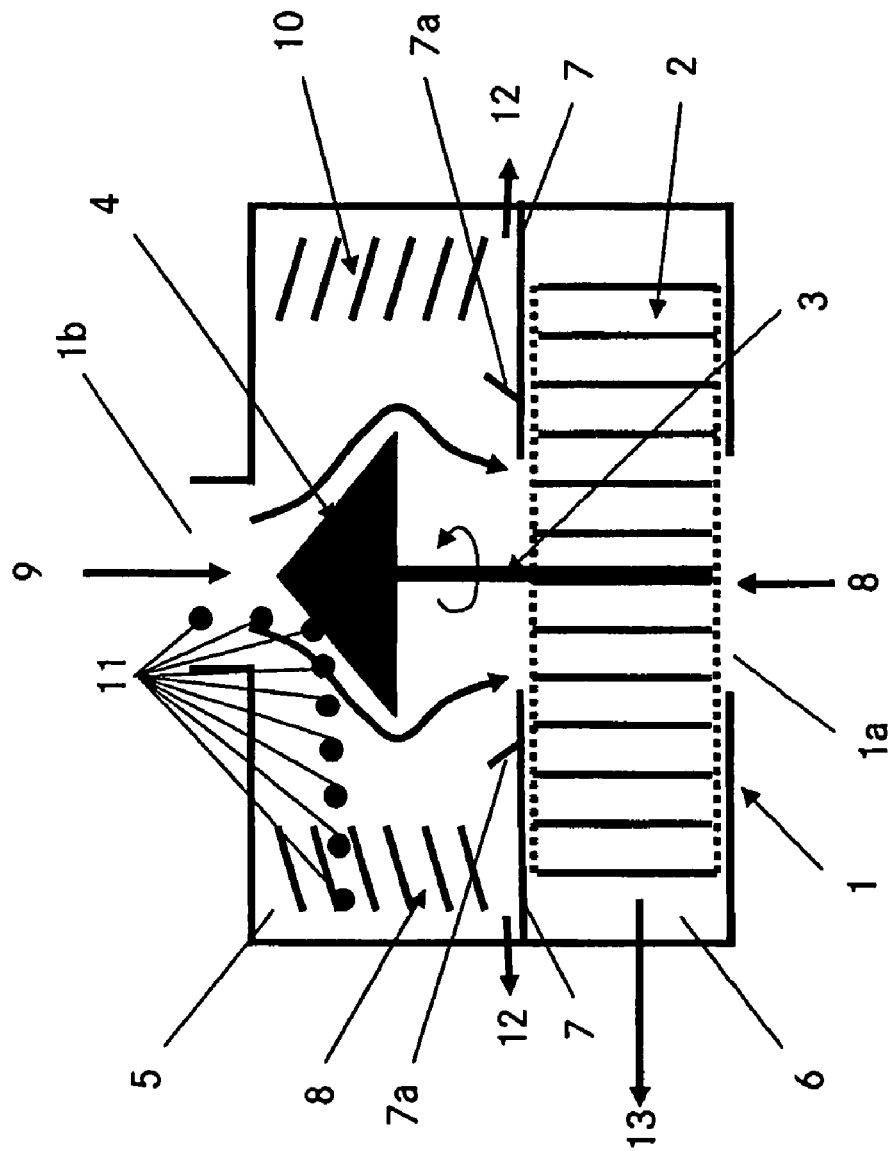
FIG. 1 is a schematic cross-sectional view of an air-conditioning blower module with an integrated air supply device according to the present invention.

In FIG. 1, numeral 1 designates a blower housing of an air-conditioning blower, by way of which air is sucked in for the passenger cell of a motor vehicle. In this embodiment, the blower housing 1 has both a port 1a for an axial suction intake of circulation air 8 and a port 1b for an axial suction intake of fresh air 9. Within the blower housing 1, on the side adjacent to the port 1a for the axial suction intake of circulation air 8, an impeller 2 of the air-conditioning blower is formed, out of which air emerges radially via a radial air outlet 13. The impeller 2 of the air-conditioning blower has a drive shaft 3. As shown in FIG. 1, this drive shaft 3 may be connected, at its end facing the port 1b for an axial suction intake of fresh air 9, to a rotating element 4 having an impermeable wall (shown schematically) preceding or upstream of the impeller 2 of the air-conditioning blower from the side of the suction intake of fresh air 9 and may likewise serve as a drive shaft for that element. Alternatively, a separate drive shaft may be provided for the rotating element 4.

The rotating element 4 may be configured, for example, in the form of a cone or an axial impeller. If the rotating element is configured as a cone, the side faces of the cone can have a concave configuration. The rotating cone may likewise also have a cone angle adjustable by centrifugal forces or the like. Alternatively, the rotating element 4 may be configured as a rotating circular disc which has either a smooth or a structured surface. Moreover, this surface may be either hydrophobic or hydrophilic. Furthermore, if a structured surface is used, grooves running radially may be formed and/or the rotating element can have at its outer edge structures which positively influence the size of drops breaking away there.

A partition 7 is formed, within the blower housing 1, between a region 5 in which the rotating element 4 is located and a region 6 in which the impeller 2 of the air-conditioning blower is located. The partition 7 separates the two regions 5, 6 from one another, starting from the wall of the blower housing 1, a region being cut out around the drive shaft 3. A web element to 7a is provided adjacent to the region in which the partition 7 is cut out and prevents water separated by drop interception elements 10, but not yet discharged from penetrating into the impeller 2 of the air-conditioning blower.

Moreover, the drop interception elements 10 are formed in the region 5 in which the rotating element 4 is located. These drop interception elements 10 may be configured as guide elements which are steep with respect to impinging drops, as shown in FIG. 1, fixed lamellae of low inclination, wedge structures with acute wedge angles which, in all alternatives, are inclined such that the drops impinge at an acute angle, or alternatively, particularly when the housing 1 is in the vertical position, a rotating perforated or impermeable wall (not shown), for discharging the separated water. In the case of the vertical position of the housing 1, the drop interception elements 10 are preferably of rotary configuration.

During the suction intake of fresh air through the port 1b for an axial suction intake of fresh air 9, fresh air which may contain raindrops 11 is sucked into the unit. These sucked-in raindrops 11 then impinge onto the rotating element 4 which is rotated by the drive shaft 3. During this impingement onto the rotating element 4, the raindrops 11 acquire an essentially tangential momentum, with the result that they are transported towards the wall of the blower housing 1.

At the wall of the blower housing 1, the raindrops 11 are intercepted by the drop interception elements 10, and the water separated by the drop interception elements 10 is then discharged through a water discharge 12. The drop interception elements 10 are inclined so that the drops impinge at an acute angle, thus preventing the drops from bursting open.

Thus, by way of water separation which is integrated into the air-conditioning blower, a compact air supply device of significantly reduced overall size for integrated air conveyance and water separation can be achieved.

Figure 2:
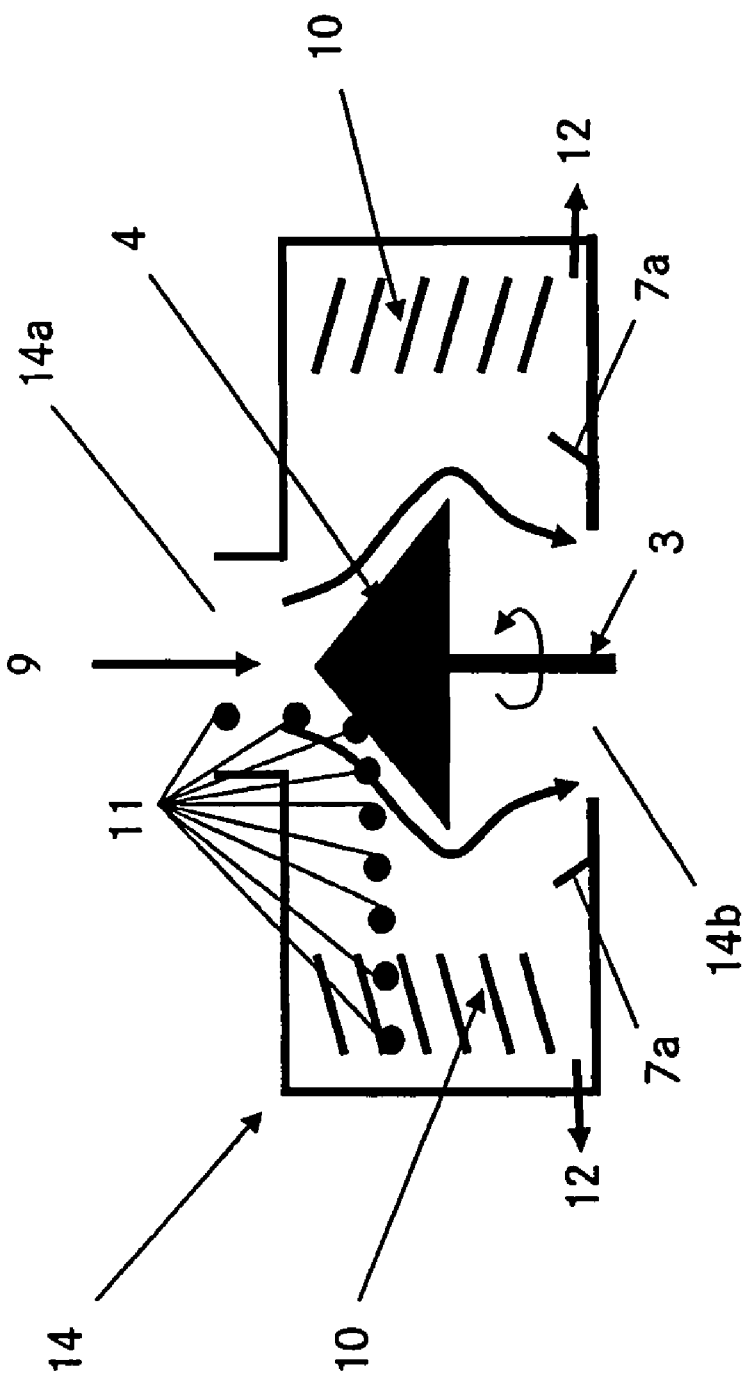
FIG. 2 is a schematic cross-sectional view of an air supply device according to the present invention independent of the air-conditioning blower shown in FIG. 1.

Alternatively, it is also contemplated to provide an air supply device which has an independent water separation module which is independent of the air-conditioning blower and which is based on the same functional principle as the air supply device described above with reference to FIG. 1. FIG. 2 shows such a separate air supply device according to the present invention with an independent water separation module. In this second embodiment, elements which are already used correspondingly in the first exemplary embodiment and are both shown and described in FIG. 1 are given corresponding reference symbols for simplification and thus no longer need to be described.

In contrast to FIG. 1, the air supply device according to FIG. 2 has a separate housing 14 of the water separation module. This housing 14 possesses a port 14a for the suction intake of possibly moisture-laden fresh air 9 and a port 14b for the issue of fresh air from which, for example, raindrops 11 are separated. Within the housing 14 is formed a rotating element 4 which is rotated by means of a drive shaft 3. Furthermore, drop interception elements 10 are provided to effect water separation. Here, too, as in the first embodiment, a perforated or impermeable wall rotating within the housing may be used alternatively to the drop interception elements 10. Water separated by the drop interception elements 10 is discharged via the water discharge 12. In this case, a web element 7a is likewise formed or provided on the underside of the likewise formed or provided on the underside of the housing 14 of the water separation module, adjacent to the port 14b for the issue of dry fresh air. The web element 7a reliably prevents separated water from penetrating into the port 14b before being discharged through the water discharge 12.

The air supply device according to the present invention, as shown in FIG. 2, can, on account of its modular construction, be separate from the air-conditioning blower to which, in such case, only the dry fresh air or circulation air is supplied. Thus, for example, an optimum utilization of free construction spaces in the vehicle which are not sufficient for an integrated embodiment according to FIG. 1 is achievable.

In the several illustrated or described embodiments, the rotating element 4 may be driven either via a specific or dedicated shaft 3 and a specific or dedicated motor or via a drive shaft 3 common to the air-conditioning blower. A specific or dedicated motor can be activated as a function of an output signal from an environment detection device such as, for example, a rain sensor which may be already present in the vehicle. Moreover, the air supply device according to the present invention may provide for particle (pre-)separation so that particles cannot pass from the sucked-in ambient air into the vehicle interior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Motor vehicle passenger cell air supply device configured for air conveyance and separation of water from fresh air supplied to the passenger cell, comprising a water separation housing having a wall, a port for axial suction intake of fresh air and an opposed port for issue of fresh air from which water has been separated, and a rotating element having an impermeable wall and operatively arranged in an axial suction intake region of the housing and upstream of the housing wall, said rotating element effectively covering the port for the axial suction intake such that all sucked-in drops of water impinge onto the impermeable wall of said rotating element for uptake of the drops and are transported towards a wall of the housing and discharged via a water discharge.

2. Air supply device as claimed in claim 1, wherein said rotating element is a rotating cone.

3. Air supply device as claimed in claim 2, wherein said rotating cone has concave side faces.

4. Air supply device as claimed in claim 2, wherein said rotating cone has an adjustable cone angle.

5. Air supply device as claimed in claim 4, wherein said rotating cone is configured to adjust the cone angle by centrifugal force.

6. Air supply device as claimed in claim 1, wherein said rotating element has a smooth surface.

7. Air supply device as claimed in claim 1, wherein said rotating element has a structured surface.

8. Air supply device as claimed in claim 1, wherein said rotating element has one of a hydrophobic and a hydrophilic surface.

9. Air supply device as claimed in claim 7, wherein the structured surface has radial grooves.

10. Air supply device as claimed in claim 7, wherein an outer edge of said rotating element has structures configured to positively influence size of the drops breaking away at the outer edge.

11. Air supply device as claimed in claim 1, wherein said rotating element is a rotating axial impeller.

12. Air supply device as claimed in claim 1, wherein drop interception elements are arranged in front of the housing wall.

13. Air supply device as claimed in claim 12, wherein the drop interception elements are fixed lamellae of low inclination.

14. Air supply device as claimed in claim 12, wherein the drop interception elements are wedge structures with acute wedge angles.

15. Air supply device as claimed in claim 12, wherein the drop interception elements are inclined in such a way that the drops impinge at an acute angle thereto.

16. Air supply device as claimed in claim 1, wherein said rotating element is driven via a dedicated shaft and motor.

17. Air supply device as claimed in claim 16, wherein the rotating element motor is actuatable as a function of an output signal from an environment detection device.

18. Air supply device as claimed in claim 17, wherein the environment detection device is a rain sensor.

19. Air supply device as claimed in claim 1, wherein the device is an independent separation module.

20. Air supply device as claimed in claim 1, wherein the device is integrated into an air-conditioning blower housing.

21. Air supply device as claimed in claim 20, wherein said rotating element is driven via a drive shaft common to the air-conditioning blower.

22. Air supply device as claimed in claim 1, wherein the device is arranged in front of a vehicle engine space dashboard.

23. Air supply device as claimed in claim 1, wherein the device is arranged behind a vehicle dashboard, and a simple water outflow in a vehicle engine space is configured as a preseparator.

24. Air supply device as claimed in claim 1, wherein the air supply device is configured to effect a particle separation.

25. Method for separating water from fresh air in a motor vehicle air supply device, comprising:
  introducing fresh air containing water into the air supply device which has a wall;
  impinging the water contained in the fresh air on a rotating element having an impermeable wall and arranged upstream of the air supply device wall in a section intake region of the air supply so that water droplets are separated from the fresh air and are transported outwardly toward the air supply device wall; and
  discharging the separated water droplets externally of the air supply device.

\* \* \* \* \*